United States Patent
Kummerer et al.

(10) Patent No.: US 9,597,628 B2
(45) Date of Patent: Mar. 21, 2017

(54) OPTIMIZATION OF A VAPOR RECOVERY UNIT

(71) Applicant: Marathon Petroleum Company LP, Findlay, OH (US)

(72) Inventors: Andrew U. Kummerer, Dayton, OH (US); Dale Boykin, Sr., Cottontown, TN (US); Kevin Stoodt, Belle Center, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 58 days.

(21) Appl. No.: 14/620,694

(22) Filed: Feb. 12, 2015

(65) Prior Publication Data

US 2015/0224439 A1    Aug. 13, 2015

Related U.S. Application Data

(60) Provisional application No. 61/939,427, filed on Feb. 13, 2014.

(51) Int. Cl.
*B01D 53/04* (2006.01)
*B01D 53/047* (2006.01)
*B01D 53/00* (2006.01)

(52) U.S. Cl.
CPC ..... *B01D 53/0454* (2013.01); *B01D 53/0476* (2013.01); *B01D 53/002* (2013.01); *B01D 2253/102* (2013.01); *B01D 2257/702* (2013.01); *B01D 2257/708* (2013.01); *B01D 2259/402* (2013.01); *B01D 2259/4516* (2013.01)

(58) Field of Classification Search
CPC ...... B01D 53/02; B01D 53/04; B01D 53/002; B01D 53/0454; B01D 53/0476; B01D 2253/102; B01D 2257/702; B01D 2257/708; B01D 2259/402; B01D 2259/4516
USPC .......................................... 95/1, 8, 11, 146
See application file for complete search history.

(56) References Cited

U.S. PATENT DOCUMENTS

| | | | |
|---|---|---|---|
| 3,867,111 A * | 2/1975 | Knowles | B01D 53/04 95/146 |
| 4,392,870 A | 7/1983 | Chieffo et al. | |
| 5,050,603 A | 9/1991 | Stokes et al. | |
| 5,681,369 A * | 10/1997 | Osborne | B01D 53/04 95/101 |
| 5,853,455 A | 12/1998 | Gibson | |
| 8,979,982 B2 * | 3/2015 | Jordan | B01D 53/0476 95/146 |

* cited by examiner

*Primary Examiner* — Frank Lawrence
(74) *Attorney, Agent, or Firm* — Emch, Schaffer, Schaub & Porcello Co., L.P.A.

(57) ABSTRACT

This vapor control logic system is for optimizing terminal loading capacity by controlling load rack fuel dispensing with a vapor recovery unit (VRU) to prevent undesirable shutdown of fuel dispensing at terminal facilities.

4 Claims, 2 Drawing Sheets

OPTIMIZATION OF A VAPOR RECOVERY UNIT

CROSS REFERENCE TO RELATED APPLICATIONS

The present patent application is based upon and claims the benefit of provisional patent no. 61/939,427, filed Feb. 13, 2014.

FIELD OF THE INVENTION

The present invention relates to optimizing terminal loading capacity by controlling load rack fuel dispensing to prevent undersirable shutdown of fuel dispensing at terminal facilities.

BACKGROUND OF THE INVENTION

An oil depot (sometimes referred to as a tank farm) is an industrial facility for the storage of oil and petrochemical products. Oil depots often include terminals where the oil or petrochemical product is dispensed into road tankers or other methods of transportation such as barges or pipelines. Products dispensed from an oil terminal are generally in their final form and are suitable for delivery to customers. The petrochemical products dispensed at a terminal are often referred to as wholesale fuel.

Terminal technology has remained largely unchanged for many years, The road tanker, or tanker truck, enters the terminal to obtain wholesale fuel. The tanker truck is connected to the terminal to begin the process of fueling. The vast majority of terminals use a bottom fill system wherein the fuel fill line attaches to the bottom of the tanker and fills the tanker from the bottom. When the tanker truck is filling, fuel vapors are produced which must be safely disposed of. These fuel vapors may be either combusted or recovered with both methods having advantages and disadvantages. When a tanker truck is filling, a vapor vent line is connected to a the tanker which transports the fuel vapors from the tanker truck to either a recovery unit or a combuster.

Many terminals have begun using is vapor recovery unit (hereinafter VRU) to recover the fuel vapors which are produced when filling a tanker truck, or other fuel transportation vehicle. A typical VRU unit has at least two adsorber vessels filled with adsorbent, such as activated carbon, a vacuum pump or other source of vacuum, a return pump and a plurality of valves. The adsorbers are properly piped and valved so that one adsorber is currently receiving vapors while the other adsorber is in a regeneration mode. When the loading process begins at the terminal, vapors are transported to the active adsorber where they are adsorbed. Once an adsorber vessel is nearly saturated or, more commonly, cycles for a predetermined cycle time, the vessel is switched to a regeneration mode and the vapors are directed to the second adsorber vessel while the first adsorber regenerates.

Regeneration occurs when the adsorbed fuel vapor is removed from the activated carbon so that the carbon in the adsorber vessel is cleansed and capable of adsorbing more fuel vapors. The fuel vapor is commonly removed by vacuum and purge air stripping. A vacuum pump extracts the fuel vapor from the saturated adsorbent and transfers it to an absorption column. The absorption column vessel contains a packing material to increase the efficiency of the absorption process. The fuel vapors from the adsorber flow up through the absorption column while liquid fuel flows down through the packing. The liquid fuel absorbs the vapors retained in the packing. The now liquefied fuel is pumped to the storage tank for reuse. All fuel vapors not absorbed in the absorption column are returned by use of a recycle line to the adsorber to be recovered.

The VRU is typically run in fifteen-minute cycles wherein one adsorber is online and accepting fuel vapors while the other adsorber is offline and in regeneration mode. Some terminals operate at full capacity putting a larger load on the VRU. Such operations tend to strain the efficiencies of the VRU's as the adsorbers commonly cannot regenerate as quickly as they become saturated. Therefore, the terminal load rack capacity exceeds the VRU capacity and the VRU may go into total shutdown where both adsorbers regenerate at the same time and the load rack operations are shutdown.

Therefore it is an object of this invention to maximize the terminal loading capacity by controlling the load rack fuel dispensing with the VRU performance outputs to prevent undesirable shutdown of the fuel dispensing at terminal facilities.

SUMMARY OF THE INVENTION

The present invention monitors operating parameter for both the operation of the load rack and the operation of the VRU and applies those measurements to coordinate and maximize efficiencies during the loading operation.

The factors which are evaluated, to determine the VRU capacity include but are not limited to the VRU design and equipment, the ambient temperature, vapor pressure upon entering the VRU, and the amount of fuel vapor exiting the VRU. The parameters being measured which pertain, to the loading rack operations include but are not limited to the product temperature, the product type being loaded, the product that was previously loaded, and the rate of loading. The present invention, in real time, provides these measurements for both the VRU and the load rack to a controller which then provides real time operating instructions to the VRU and load rack to assist in coordinating fuel flow from the load rack with operating capacities of the VRU. This provides for maximized efficient fuel loading at the terminals.

The present invention optimizes the utilization of all data points to determine VRU saturation levels, reduce the flow rate of fuel into the tanker truck, thereby avoiding maximum saturation. Thus ensuring the VRU remains in service and never becomes fully saturated, allowing more fuel to be dispensed at the terminal throughout the given time period.

Other objects and advantages of the present it will become apparent to those sidled in the art upon a review of the following detailed description of the preferred embodiments and the accompanying drawings.

IN THE DRAWINGS

DETAILED DESCRIPTION OF THE INVENTION

Figure 1:
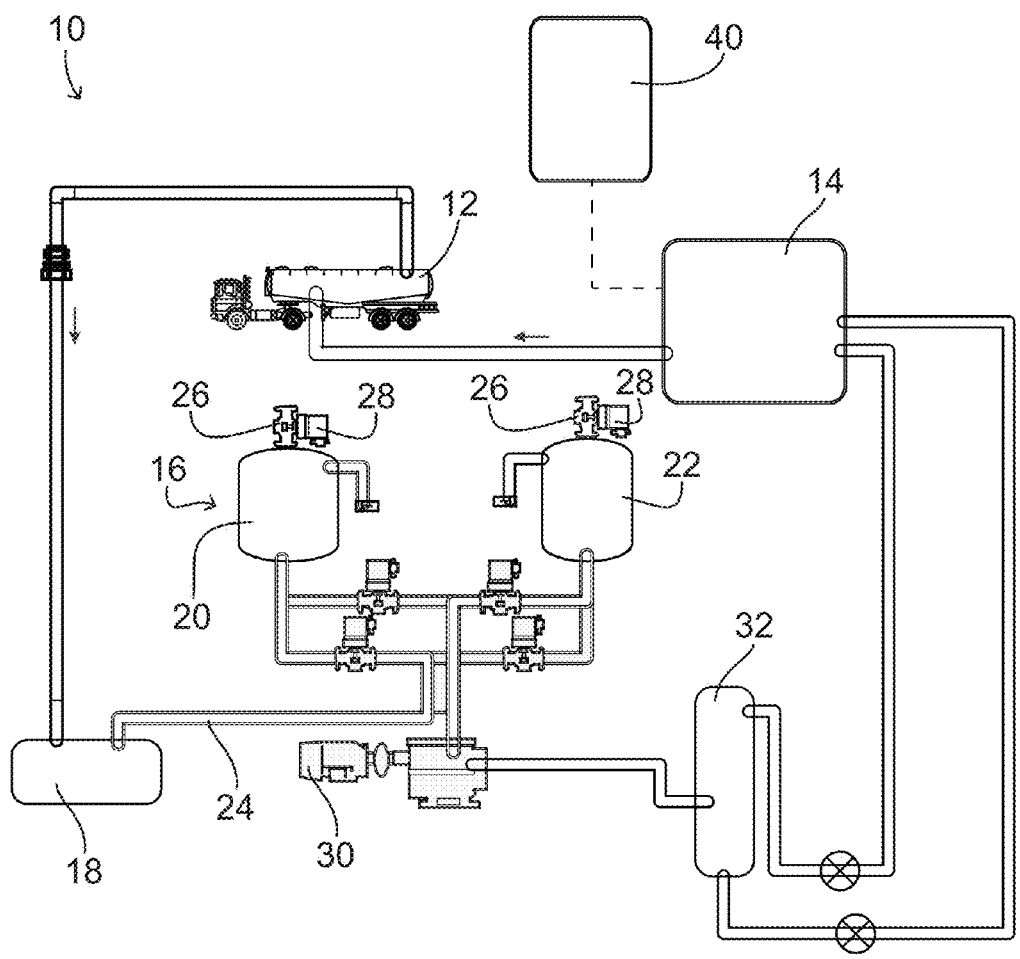
FIG. 1 is a top plan view of a vapor recovery unit of the present invention.

Referring now to FIG. 1 a tanker truck 12 enters a terminal 10 and fuel is dispensed into tanker truck 12 from a storage tank 14. Fuel vapors are recovered from tanker truck 12 and transported to a vapor recovery unit (VRU) 16. The fuel vapors may travel through condensation collection unit 18 prior to arriving at VRU 16. The condensation collection unit 18, however, is not integral to the present invention. A typical VRU 16 has two adsorber vessels 20 and 22 which are identical and preferably contain activated carbon to capture the fuel vapors. In the preferred mode of operation, one adsorber vessel 20 is on-line while the second adsorber vessel 22 is regeneration mode. The second adsorber 22, during regeneration mode, is closed off from fuel vapor line 24 and all fuel vapors flow to the on-line adsorber 20. For the purposes of this illustration adsorber 20 be on-line while adsorber 22 is in regeneration. The fuel vapors flow into adsorber 20 from loading tanker truck 12. When adsorber 20 is in fueling mode, the top 26 of the adsorber is vented to the atmosphere. A continuous emissions monitor 28 (CEM) is attached to monitor and analyze the effluent stream exiting the adsorber.

The present invention utilizes real-time data points collected from the operations of the load rack and the operations of the VRU to optimize the operations of the VRU 16 and prevent a fueling shutdown. Such data includes but is not limited to: real-time ambient temperature, product temperature, load rate, product being loaded, product previously loaded, and the effluent rates from the adsorbers.

Figure 2:
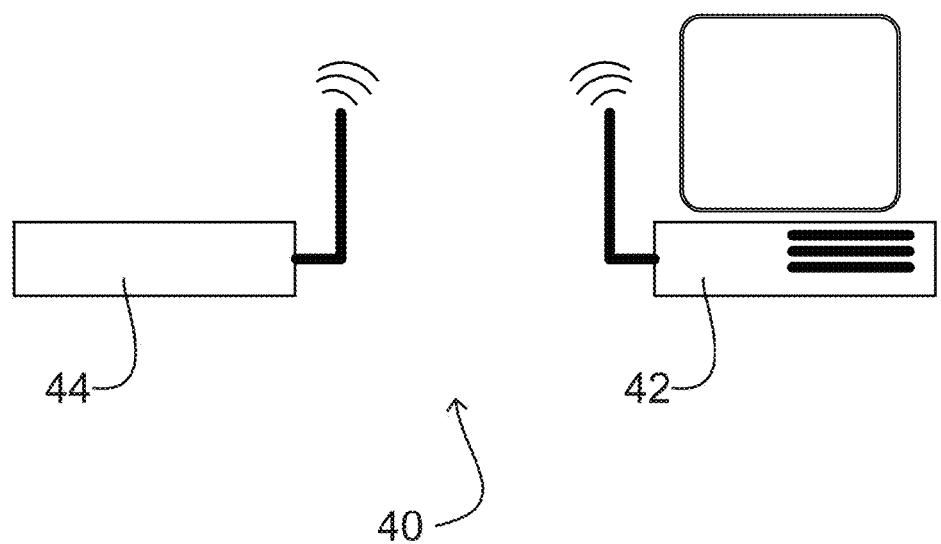
FIG. 2 shows vapor control logic system.

FIG. 2 shows vapor control logic system 40. Logic system 40 includes data processor 42 and controller 44. Vapor control logic system 40 uses data processor 42 to collect and analyze the performance of VRU 16 and fuel dispensing from the load rack in real-time. Data processor 42 is coupled to controller 44 which is configured to adjust the flow rate at the load rack based on the parameters, data points and desired factors in real-time. Continuous emissions monitor 28 utilizes data processor 42 and controller 44, to adjust the flow rate at the load rack to ensure that VRU 16 does not reach a shutdown situation.

The present invention uses a data processor to collect and analyze the performance of the VRU and load rack operations in real-time. The invention provides that the fuel flow rate can be reduced such that VRU can perform at an equivalent pace. In the preferred embodiment the data processor will prevent the VRU from shutting down by reducing the fuel flow rate to a level that is equal to or below the VRU capacity at any given time. The optimal fuel flow rate will be determined utilizing the real-time data points such as ambient temperature, product temperature, product being loaded, product previously loaded and the emissions from the VRU.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A method for optimizing terminal loading capacity by controlling the operation of load rack fuel dispensing and the operation of a vapor recovery unit (VRU) to prevent undesireable shutdown of fuel dispensing at terminal facilities comprising the steps of:
   providing a vapor recovery unit (VRU) comprising a first bed of adsorbent and a second bed of adsorbent;
   providing a vapor control logic system which controls the operation of the VRU based upon one or more of the following operating parameters including the VRU design, and ambient temperatures;
   controlling the operations of the load rack fuel dispensing with the vapor control logic system and adjusting a flow rate at the load rack used upon one or more of the following parameters: product temperatures, product type being loaded, product type previously loaded and rate of loading;
   wherein the vapor control logic system uses a data processor to collect and analyze the performance of the VRU and load rack fuel dispensing in real time; and
   wherein the data processor is in communication with a controller configured to adjust the flow rate at the load rack based upon on the VRU parameters and the load rack parameters, in real-time.

2. A process according to claim 1 wherein a continuous emissions monitor utilizes the data processor and the controller, to adjust the flow rate at the load rack to ensure that the VRU does not reach a shutdown situation.

3. A process according to claim 1 wherein the vapor control logic system is configured to provide that the fuel flow rate can be reduced such that VRU can perform at an equivalent pace.

4. A process according to claim 1 wherein the data processor is configured to prevent the VRU from shutting down by reducing the fuel flow rate to a level that is equal to or below the VRU capacity at a given time.

* * * * *

UNITED STATES PATENT AND TRADEMARK OFFICE
CERTIFICATE OF CORRECTION

Page 1 of 1

PATENT NO. : 9,597,628 B2
APPLICATION NO. : 14/620694
DATED : March 21, 2017
INVENTOR(S) : Andrew U. Kummerer, Dale Boykin, Sr. and Kevin Stoodt It is certified that error appears in the above-identified patent and that said Letters Patent is hereby corrected as shown below:

In the Claims

In Column 4, Line 23, please delete "used" and insert -- based --.

Signed and Sealed this
Thirtieth Day of May, 2017

Michelle K. Lee
*Director of the United States Patent and Trademark Office*